United States Patent [19]

Babyak

[11] Patent Number: 4,880,449
[45] Date of Patent: Nov. 14, 1989

[54] COMPRESSOR SEAL OIL DEGASSING TANK VENT GAS RECOVERY BY METHOD OF LEVEL CONTROL

[75] Inventor: Mark R. Babyak, North Huntingdon, Pa.

[73] Assignee: Elliott Turbomachinery Co., Inc., Jeannette, Pa.

[21] Appl. No.: 269,012

[22] Filed: Nov. 9, 1988

[51] Int. Cl.[4] .............................................. B01D 19/00
[52] U.S. Cl. ........................................ 55/170; 55/189; 55/195; 210/104; 210/188
[58] Field of Search ...................... 55/21, 55, 165, 169, 55/170, 189, 192, 195, 213; 210/114, 188

[56] References Cited

U.S. PATENT DOCUMENTS

| | | | |
|---|---|---|---|
| 2,570,134 | 10/1951 | Lancaster et al. | 230/207 |
| 2,878,889 | 3/1959 | Gilbert | 55/170 X |
| 3,420,434 | 1/1969 | Swearingen | 230/116 |
| 4,105,093 | 8/1978 | Dickinson | 184/6.11 |
| 4,201,555 | 5/1980 | Tkach | 55/55 X |
| 4,477,223 | 10/1984 | Giroux | 415/169 |
| 4,561,866 | 12/1985 | Altmann et al. | 55/189 X |
| 4,606,652 | 8/1986 | Swearingen | 384/130 |
| 4,668,252 | 5/1987 | Gerdau | 55/191 |
| 4,715,398 | 12/1987 | Shouldice et al. | 55/189 X |
| 4,722,663 | 2/1988 | Swearingen | 415/169 |

Primary Examiner—Charles Hart
Attorney, Agent, or Firm—Webb, Burden, Ziesenheim & Webb

[57] ABSTRACT

Apparatus for separating a gas from a liquid includes a degassing tank for receiving a mixture of the gas and liquid. The tank permits the gas to separate from the mixture and rise to the top of the tank and permits the liquid to separate from the mixture and settle to the bottom of the tank. The apparatus includes a vacuum regulator for withdrawing the separated gas from the degassing tank, a level detector for measuring the level of fluid in the degassing tank and a controller responsive to the level detector for controlling the vacuum regulator and reducing the gas flow therefrom as the fluid level in the degassing tank increases.

20 Claims, 2 Drawing Sheets

COMPRESSOR SEAL OIL DEGASSING TANK VENT GAS RECOVERY BY METHOD OF LEVEL CONTROL

BACKGROUND OF THE INVENTION

1. Field of the Invention

This invention is related to the separation of a gas from a liquid and, more particularly, to the degassification of a seal oil or lubricating oil used in rotating machinery.

2. Background Art

High speed rotating machinery, such as compressors, turbines, or other turbomachinery, typically employs oil or other liquid lubricant based seals and/or bearings around rotating shafts. The working gas moving through or being moved by the rotating machinery will, since it is under pressure, tend to become mixed with and entrained within the liquid lubricant, both reducing the effectiveness of the lubricant and resulting in a loss of the gas. The contaminated lubricant is normally withdrawn on a regular basis and replaced with clean lubricant to maintain optimum operation of the rotating machinery.

The contaminated lubricant can be disposed of, which is wasteful of both the working gas and the lubricant, or can be passed to a degassing tank for the separation of the gas from the lubricant. The separated gas can then be vented to the atmosphere or passed back into the rotating machinery. The clean lubricant can be passed to a holding tank for the lubrication system. Prior patents showing various degassing tank arrangements include U.S. Pat. Nos. 2,570,134; 3,420,434; 4,105,093; 4,477,223; 4,606,652; 4,668,252; and 4,722,663.

The line carrying the recovered working gas from the degassing tank should not pass directly to the rotating machinery without some form of control mechanism. Otherwise, the risk would exist of passing lubricant directly into the gas areas of the rotating machinery, via the degassing tank, and damaging the machinery. In addition, the pressure of the gas released from the degassing tank should be controlled to avoid high pressure damage to downstream equipment. In one prior arrangement, an ejector passed the gas from the degassing tank to a compressor. A control valve, responsive to the pressure of the gas exiting the degassing tank, passed around the ejector and bypassed gas flow to the compressor if the gas pressure was too high. However, this arrangement did not permit proper control with higher gas pressures, particularly when wide pressure variations are present such as during start-up or settle out of the rotating equipment, without using an expensive, high pressure control valve.

It is an object of this invention to separate the entrained gas from a liquid lubricant in rotating machinery and recover and reuse both the gas and lubricant. It is another object to reinject the gas back into the rotating machinery without thereby injecting the lubricant into the rotating machinery. Moreover, it is desirable to provide a control arrangement for reinjecting the recovered gas which is inexpensive and reliable, but which can handle high pressures during start-up, settle out or the like.

SUMMARY OF THE INVENTION

Accordingly, I have invented an apparatus for separating a gas, such as a compressor gas, from a liquid, such as a seal oil, which comprises a degassing tank for receiving a mixture of the gas and liquid. The degassing tank permits the gas to separate from the mixture and rise o the top of the tank and permits the liquid to separate from the mixture and settle to the bottom of the tank. The apparatus also includes a vacuum regulator for withdrawing the separated gas from the degassing tank and a means for detecting the level of liquid in a degassing tank. The apparatus also includes a control means responsive to the level detecting means for controlling the vacuum regulator and reducing the gas flow therefrom as the fluid level in the degassing tank increases.

The control means can be a bypass means for controllably diverting, in response to the liquid level detected by the level detecting means, the flow of gas out of the vacuum regulator. The bypass means includes a control valve operated gas line connected across the vacuum regulator means and includes means for controlling the operation of the control valve in response to the level detecting means. As a result, the control valve is closed when the liquid level is low and is gradually opened as the liquid level rises. The control valve is connected to a diaphragm controller and the level detecting means controls the pressure of a pressurized control gas supplied to the diaphragm controller. This control gas is preferably pressurized air.

In accordance with the preferred embodiment of the present invention, the vacuum regulator includes an ejector having a suction port, an inlet port and a discharge port. It also includes a motive gas supplied under pressure to the inlet port. The suction port of the ejector is connected to a gas inlet of the degassing tank and the control valve operated gas line is connected across the discharge port and suction port of the ejector. The motive gas can come from a separate source but is preferably supplied from a lower pressure stage of a compressor or the like. The apparatus may also include a check valve in the gas line extending between the degassing tank and the suction port of the ejector.

DESCRIPTION OF THE PREFERRED EMBODIMENT

Figure 1:
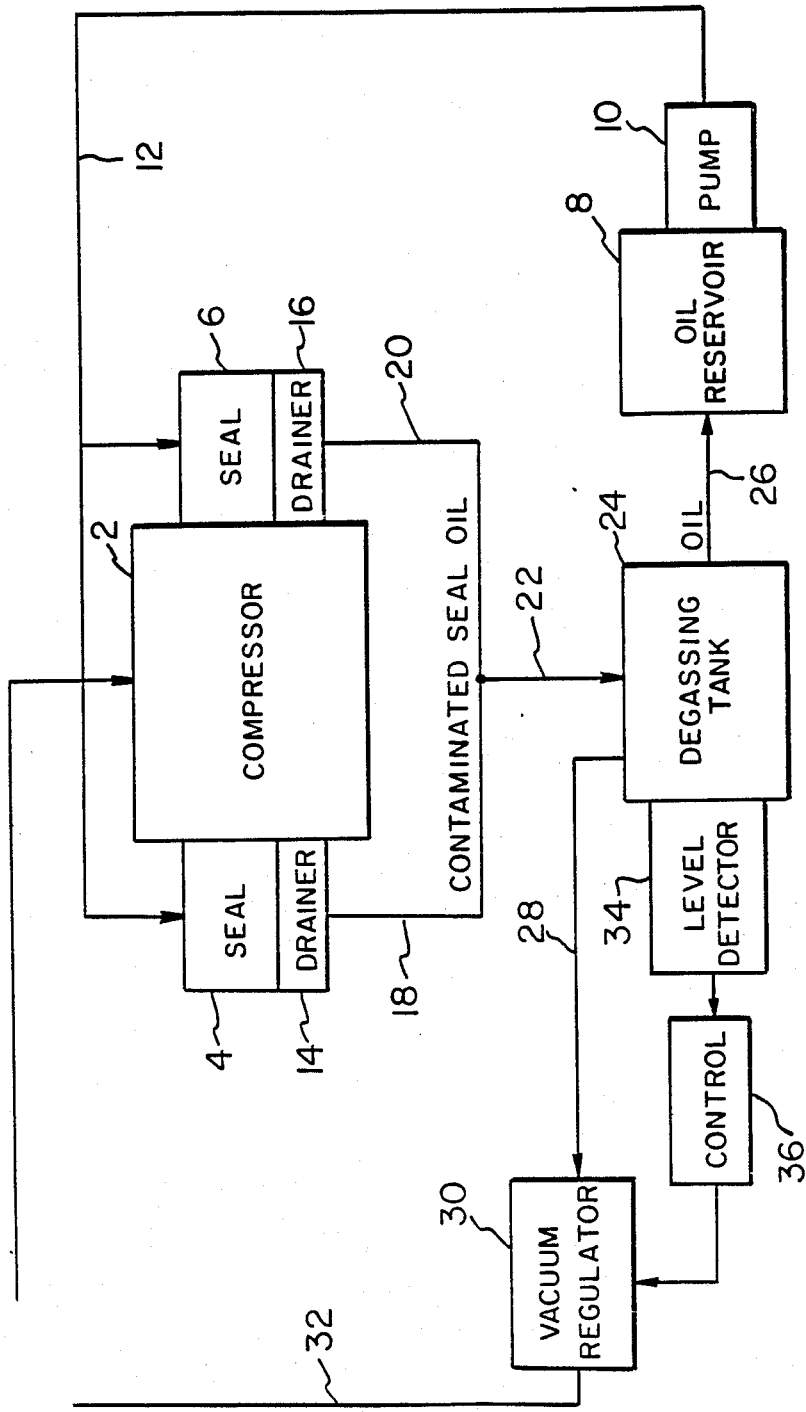
FIG. 1 is a schematic drawing of a compressor system utilizing the degassing tank control apparatus of the present invention.

The degassing tank control apparatus of the present invention is illustrated schematically in FIG. 1 in connection with a centrifugal compressor 2. While a compressor is shown, it is to be understood that the present invention can be utilized in connection with any rotating machinery, such as turbines, compressors or other turbomachinery utilizing lubricated seals or bearings.

The compressor 2 shown in FIG. 1 includes shaft seals 4 and 6 at opposite ends thereof. While only two shaft seals are shown, it is well known that seals or bearings can be used in a variety of locations on the rotating machinery. A lubricating and sealing fluid, typically a high grade oil, passes from an oil reservoir 8 by a pump 10 along oil line 12 to the seals 4,6. The lubricating and sealing fluid will be referred to as a seal oil for purposes of the arrangement shown in FIG. 1. The seal oil is used both to keep the compressor gas from escaping to the atmosphere and to cool the seals 4,6 as the shaft rotates.

As the compressor 2 is operated in the normal course, the seal oil will become contaminated with the compressor gas, dirt, and the like. Typically, shaft seals used in connection with compressors or other rotating machinery have a drainer for periodically or continuously removing the contaminated seal oil. The removed seal oil is then replaced with clean seal oil from the oil reservoir 8. As shown in FIG. 1, shaft seal 4 includes drainer 14 at a lower portion thereof and shaft seal 6 includes a drainer 16 at a lower portion thereof. The contaminated seal oil passes from shaft seal 4 through drainer 14 and drain line 18 connected thereto. The contaminated seal oil passe from shaft seal 6 through drainer 16 and drain line 20 connected thereto. Drain lines 18 and 20 are joined to inlet line 22 which passes all of the contaminated seal oil from the shaft seals 4,6 of the compressor 2 to a degassing tank 24.

The degassing tank 24 is a known tank, in the nature of a settling tank, for separating gases from liquids. The contaminated seal oil which flows into the degassing tank 24 contains a compressor gas entrained therein. The degassing tank 24 permits the compressor gas to bubble upward and separate from the seal oil. Particulate matter in the seal oil may also settle downward in the degassing tank 24. After the separation has taken place, the degassing tank 24 will hold clean seal oil at the bottom and compressor gas at the top.

The clean seal oil is then passed from the degassing tank 24 by means of an oil outlet line 26 to the oil reservoir 8 for later use in the shaft seals 4,6. The recovered compressor gas is drawn out of the degassing tank 24 through a gas outlet line 28 by means of a vacuum regulator 30, which passes the withdrawn compressor gas back to the compressor 2 along gas line 32. The compressor gas withdrawn from the degassing tank 24 by the vacuum regulator 30 is usually injected into a lower pressure stage of the compressor 2. A level detector 34 adjacent the degassing tank 24 measures the level of the liquid seal oil in the degassing tank 24 and supplies a signal proportional to that level to a control device 36 which, in turn, controls the operation of the vacuum regulator 30. As will be explained hereinafter in more detail, the level of the liquid seal oil in the degassing tank 24 controls the vacuum regulator 30 and, as a result, controls the rate of flow of the recovered compressor gas therefrom.

Figure 2:
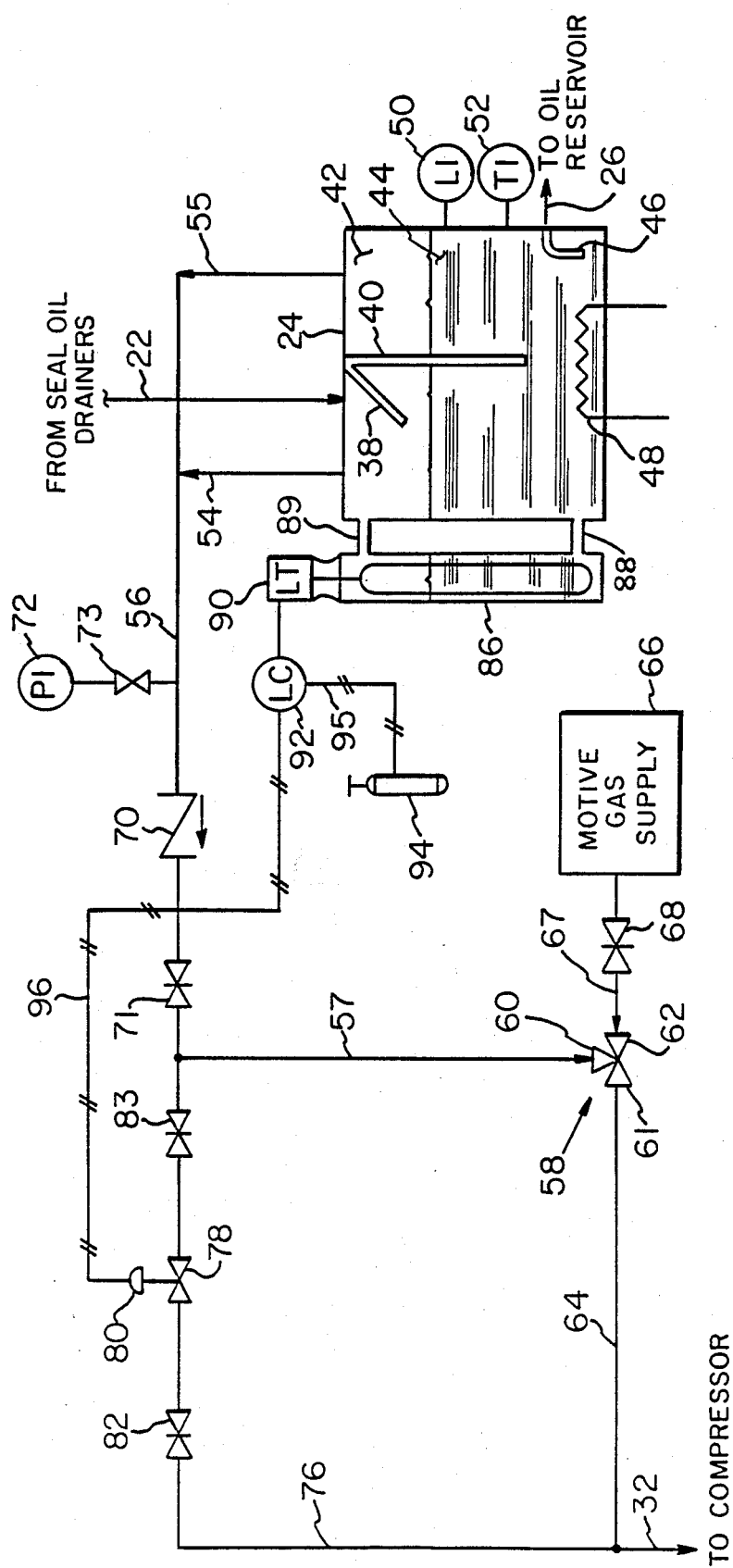
FIG. 2 is a schematic drawing of the degassing tank control apparatus of the present invention.

FIG. 2 shows the details of the arrangement for controlling the flow of the recovered compressor gas from the degassing tank 24 to the compressor 2 in accordance with the present invention. The degassing tank 24 receives the contaminated seal oil at an upper area thereof by way of inlet line 22. The incoming fluid strikes a solid angled plate 38 in the interior of the degassing tank. The plate 38 slows the flow of the incoming fluid and minimizes any disturbance of the previously separated gas and oil in the degassing tank 24 by incoming fluids. A similar effect is achieved by a baffle plate 40 which extends downward from the top of the degassing tank 24 and extends toward, but stops short of, the bottom of the degassing tank 24. The baffle 40 divides the degassing tank 24 into two separate gas chambers and reduces flow of the seal oil therein. The degassing tank 24 allows the compressor gas 42 to rise to the top area of the tank 24 and become separated from the seal oil 44 at the lower area of the tank 24.

The seal oil is drained from the degassing tank 24 through an interior elbow 46 oriented toward the bottom of the tank 24 and connected to the oil outlet line 26 which feeds the oil reservoir 8. The recovered seal oil 44 in the degassing tank 24 can be advantageously heated by an interior electrical heater 48 or the like before being passed to the oil reservoir 8. The degassing tank 24 may also include, as is common in the art, an oil level indicator 50, such as a sight glass, and a temperature indicator 52, both positioned on the exterior of the tank 24. The indicators permit an operator to easily monitor the conditions in the degassing tank 24.

The separated compressor gas 42 flows from the degassing tank 24 through a pair of gas lines 54,55, one for each chamber of the tank 24, into gas line 56, gas line 57 and into the suction port 60 of an ejector 58. The compressor gas then flows out of the discharge port 61 of the ejector 58 through gas line 64 and into gas line 32 which extends to the compressor 2 as shown in FIG. 1. The ejector 58 is a horn shaped device having a suction port 60, discharge port 61 and inlet port 62. A motive gas is supplied under pressure from a motive gas supply 66 via gas line 67 to the inlet port 62 of the ejector 58 and creates a vacuum from the suction port 60 to the discharge port 61. In this manner, the compressor gas is sucked or drawn out of the degassing tank 24 and into the suction port 60 of the ejector 58, and is discharged under pressure from the discharge port 61 of the ejector 58. Block valve 68 can be placed in gas line 67 between the motive gas supply 66 and the inlet port 62 of the ejector 58. While the embodiment of the present invention shown in FIG. 2 contemplates the use of an ejector 58 in combination with a motive gas source 66 to draw the compressor gas out of the degassing tank 24, other vacuum creating devices, such as a vacuum pump, could also be used to draw the compressor gas from the degassing tank 24. A Penberthy GL series ejector can advantageously be used as the ejector 58 shown in FIG. 2.

The motive gas supply 66 can be a separate source of pressurized gas or can come from a stage of the compressor 2. It is preferred to use gas from a later, higher pressure stage of the compressor 2 as the motive gas for the ejector 58. Since the motive gas becomes mixed with the gas withdrawn from the degassing tank 24 and is discharged from the ejector 58, a motive gas supplied from a separate source should be the same as or compatible with the compressor gas.

Gas line 56 includes a check valve 70 which permits the flow of gas only out of the degassing tank 24 and functions to protect the tank 24. Gas line 56 can also include block valve 71 between the check valve 70 and gas line 57 downstream therefrom. A pressure indicator 72 is connected via block valve 73 to gas line 56 to give a reading of the pressure of the compressor gas exiting the degassing tank 24.

A bypass gas line 76 extends around the ejector 58 across the suction port 60 and discharge port 61. As shown in FIG. 2, the bypass gas line 76 extends between gas line 57, which feeds the suction port 60, and gas line 64, which extends from the discharge port 61. A control valve 78 controls the flow of gas through the bypass gas line 76 and a diaphragm controller 80 operates the control valve 78. Block valves 82 and 83 can be located in the bypass gas line 76 on opposite sides of the control valve 78. A suitable control valve with diaphragm controller is the Fisher 657EZ series valve.

Block valves 68, 71, 73, 82 and 83, also known in the art as gate valves, are normally fully open and do not interfere with or participate in the normal operation of the present invention. The block valves are used to block out or isolate a part of the system during servicing procedures or the like and are typically provided in any fluid system arrangement. However, the block valves are not required for the present invention to operate in its intended manner.

In accordance with the present invention, a precise level detector 86 is provided exterior of and connected to the degassing tank 24. The level detector 86 includes a hollow, lower feed pipe 88 and a hollow, upper feed pipe 89 extending into and in fluid communication with the interior of the degassing tank 24. The liquid seal oil inside of the degassing tank 24 will pass into the level detector 86 through these feed pipes 88, 89. A mechanical signal developed by the fluid inside of the level detector 86 and directly related to the level of fluid in the degassing tank 24 is converted into a proportional pneumatic signal in a level transmitter 90 attached to the top of the level detector 86. While the spacing between the feed tubes 88, 89 is typically preset in a particular level detector 86, one can set the span length on the level transmitter 90 by selecting two set points in order to develop a proportional pneumatic signal between a lower fluid level, which develops a zero output signal, and a higher fluid level, which develops a maximum output signal.

The pneumatic signal developed by the level transmitter 90 is supplied directly to a level controller 92 immediately adjacent thereto. The level controller 92 is basically a pressure regulator which controls the flow of a control gas, such as a pressurized air from an air supply 94, through air line 95 to the level controller 92 and through air line 96 to the diaphragm controller 80 for the control valve 78. The air supply 94 can be a separate source of pressurized air or, more preferably can be the available plant pressurized air supply. The level detector 86, level transmitter 90 and level controller 92 are usually sold together as a unit, such as a Fisher 2500 series device.

The control valve 78 operates to permit or restrict the flow of a fluid therethrough. The diaphragm controller 80 opens and closes the control valve 78 depending on the magnitude of the air pressure thereon from air line 96. The pressure in air line 96 is controlled by the level controller 92 and the level transmitter 90. The output signal developed by the level transmitter 90 is directly proportional to the level of the seal oil in the degassing tank 24. Accordingly, it can be seen that the degree to which the control valve 78 is open is directly proportional to the level of the seal oil in the degassing tank 24.

Under normal operating conditions, the seal oil 44 in the degassing tank 24 is at a lower level, the level detector 86 is generating little or no signal, the air pressure supplied to the diaphragm controller 80 is minimal, the control valve 78 is closed, and the separated compressor gas 42 is drawn out of the degassing tank 24 by the ejector 58 via gas lines 54, 55, 56 and 57 and discharged into the compressor 2 via gas lines 64 and 32. If the level of the seal oil in the degassing tank 24 changes too fast or reaches too high a level, the pressure of the discharged compressor gas may become too high or, more importantly, the seal oil may be drawn out of the degassing tank 24 and injected into the working parts of the compressor 2. The control valve 78 is arranged to prevent such unwanted results. As the oil level rises, as measured by the level detector 86, the pressure of the air in line 96 is increased and the control valve 78 is opened to an extent. The greater the rise in the level of the seal oil, the more the control valve 78 is opened, reaching a full-open condition when the seal oil reaches the upper preset level. As the control valve 78 is opened, gas line 76 tends to bleed off the gas supplied to the compressor via gas line 64 and 32 and reduce the effective suction of the ejector 58. The gas thus diverted will flow in a clockwise loop through, in order, gas line 76, control valve 78, gas line 57, ejector 58 and gas line 64. This reduces the gas flow from the degassing tank 24 to the compressor 2 and prevents the oil 44 from being withdrawn by the ejector 58. Thus, by detecting the level of recovered seal oil in the degassing tank 24, the flow of the gas discharged therefrom can be controlled in a safe, precise, reliable, economical and uncomplicated manner.

Having thus described the preferred embodiment of the present invention, it is to be understood that the present invention may be otherwise embodied within the scope of the appended claims.

I claim:

1. An apparatus for separating a gas, such as a compressor gas, from a liquid, such as a seal oil, comprising
   (a) a degassing tank for receiving a mixture of gas and liquid, permitting the gas to separate from the mixture and rise to the top of the tank and permitting the liquid to separate from the mixture and settle to the bottom of the tank;
   (b) a vacuum regulator for withdrawing the separated gas from the degassing tank;
   (c) means for detecting the level of liquid in the degassing tank; and
   (d) control means responsive to the level detecting means for controlling the vacuum regulator and reducing the gas flow therefrom as the fluid level in the degassing tank increases.

2. An apparatus for separating a gas, such as a compressor gas, from a liquid, such as a seal oil, comprising:
   (a) a degassing tank for receiving a mixture of gas and liquid, permitting the gas to separate from the mixture and rise to the top of the tank and permitting the liquid to separate from the mixture and settle to the bottom of the tank;
   (b) a vacuum regulator for withdrawing the separated gas from the degassing tank;
   (c) means for detecting the level of liquid in the degassing tank; and
   (d) control means responsive to the level detecting means for controlling the vacuum regulator and replacing the gas flow therefrom as the fluid level in the degassing tank increases, wherein the control means is a bypass means for controllably diverting, in response to the liquid level detected by the level detecting means, the flow of gas out of the vacuum regulator.

3. The apparatus in claim 2 wherein the bypass means includes a control valve operated gas line connected across the vacuum regulator and means for controlling the operation of the control valve in response to the level detecting means, whereby the control valve is closed when the liquid level is low and is gradually opened as the liquid level rises.

4. The apparatus of claim 3 wherein the control valve is connected to a diaphragm controller and the level detecting means controls the pressure of a pressurized control gas supplied to the diaphragm controller.

5. The apparatus of claim 4 wherein the control gas is pressurized air.

6. The apparatus of claim 3 wherein the vacuum regulator includes an ejector having a suction port, an inlet port and a discharge port and also includes a motive gas supplied under pressure to the inlet port, with the suction port connected to a gas outlet of the degassing tank and with the control valve operated gas line connected across the discharge port and suction port of the ejector.

7. The apparatus of claim 6 wherein the motive gas is supplied from a lower pressure stage of a compressor.

8. The apparatus of claim 6 further including a check valve in a gas line extending between the degassing tank and the suction port of the ejector.

9. An apparatus for separating a gas from a liquid in a rotating machinery system and re-using the gas and liquid in the system, said apparatus comprising:
 (a) a high speed rotating machinery having at least one bearing seal containing a seal oil;
 (b) means for supplying clean seal oil to the bearing seal;
 (c) means for draining contaminated seal oil from the bearing seal;
 (d) a degassing tank for receiving the contaminated seal oil containing a gas entrained therein, and for permitting the gas to separate from the seal oil and rise to the top of the tank, and for permitting the seal oil to settle to the bottom of the tank;
 (e) means for withdrawing the seal oil from the degassing tank and passing the seal oil to a storage reservoir;
 (f) a vacuum regulator for withdrawing the separated gas from the degassing tank and injecting the separated gas into the rotating machinery;
 (g) means for detecting the level of seal oil in the degassing tank; and
 (h) control means responsive to the level detecting means for controlling the vacuum regulator and reducing the gas flow therefrom as the fluid level in the degassing tank increases.

10. The apparatus of claim 9 wherein the control means is a bypass means for controllably diverting, in response to the liquid level detected by the level detecting means, the flow of gas out of the vacuum regulator.

11. The apparatus in claim 10 wherein the bypass means includes a control valve operated gas line connected across the vacuum regulator and means for controlling the operation of the control valve in response to the level detecting means, whereby the control valve is closed when the liquid level is low and is gradually opened as the liquid level rises.

12. The apparatus of claim 11 wherein the control valve is connected to a diaphragm controller and the level detecting means controls the pressure of a pressurized control gas supplied to the diaphragm controller.

13. The apparatus of claim 12 wherein the control gas is pressurized air.

14. The apparatus of claim 11 wherein the vacuum regulator includes an ejector having a suction port, an inlet port and a discharge port and also includes a motive gas supplied under pressure to the inlet port, with the suction port connected to a gas outlet of the degassing tank and with the control valve operated gas line connected across the discharge port and suction port of the ejector.

15. The apparatus of claim 14 wherein the motive gas is supplied from the rotating machinery.

16. The apparatus of claim 14 wherein the rotating machinery is a centrifugal compressor and the motive gas is supplied from a lower pressure stage of the compressor.

17. The apparatus of claim 14 further including a check valve in a gas line extending between the degassing tank and the suction port of the ejector.

18. An apparatus for separating a compressor gas from a seal oil comprising:
 (a) a degassing tank for receiving a mixture of seal oil and compressor gas, permitting the gas to separate from the mixture and rise to the top of the tank, and permitting the oil to separate from the mixture and settle to the bottom of the tank;
 (b) an ejector for withdrawing the separated gas from the degassing tank, with the ejector having a suction port, an inlet port and a discharge port, with said suction port connected to a gas outlet of the degassing tank;
 (c) a motive gas source connected to the inlet port of the ejector and supplying pressurized gas thereto;
 (d) a control valve operated gas line connected across the suction and discharge ports of the ejector and a diaphragm controller connected to the control valve and controlling its operation;
 (e) means for detecting the level of oil in the degassing tank; and
 (f) means responsive to the level detecting means for supplying to the diaphragm controller a pressurized control gas having a pressure proportional to the level of oil in the degassing tank, whereby the control valve will be progressively opened from a closed position as the oil level increases and a portion of the gas flowing out of the discharge port of the ejector will be diverted.

19. The apparatus of claim 18 wherein the means responsive to the level detecting means is a level controller disposed in a gas line extending between the diaphragm controller and a source of the pressurized control gas.

20. The apparatus of claim 19 wherein the pressurized control gas is pressurized air.

* * * * *